Nov. 18, 1924.  
G. G. HEGERMAN  
1,516,278  
CINEMATOGRAPH FILM  
Filed Aug. 6, 1923
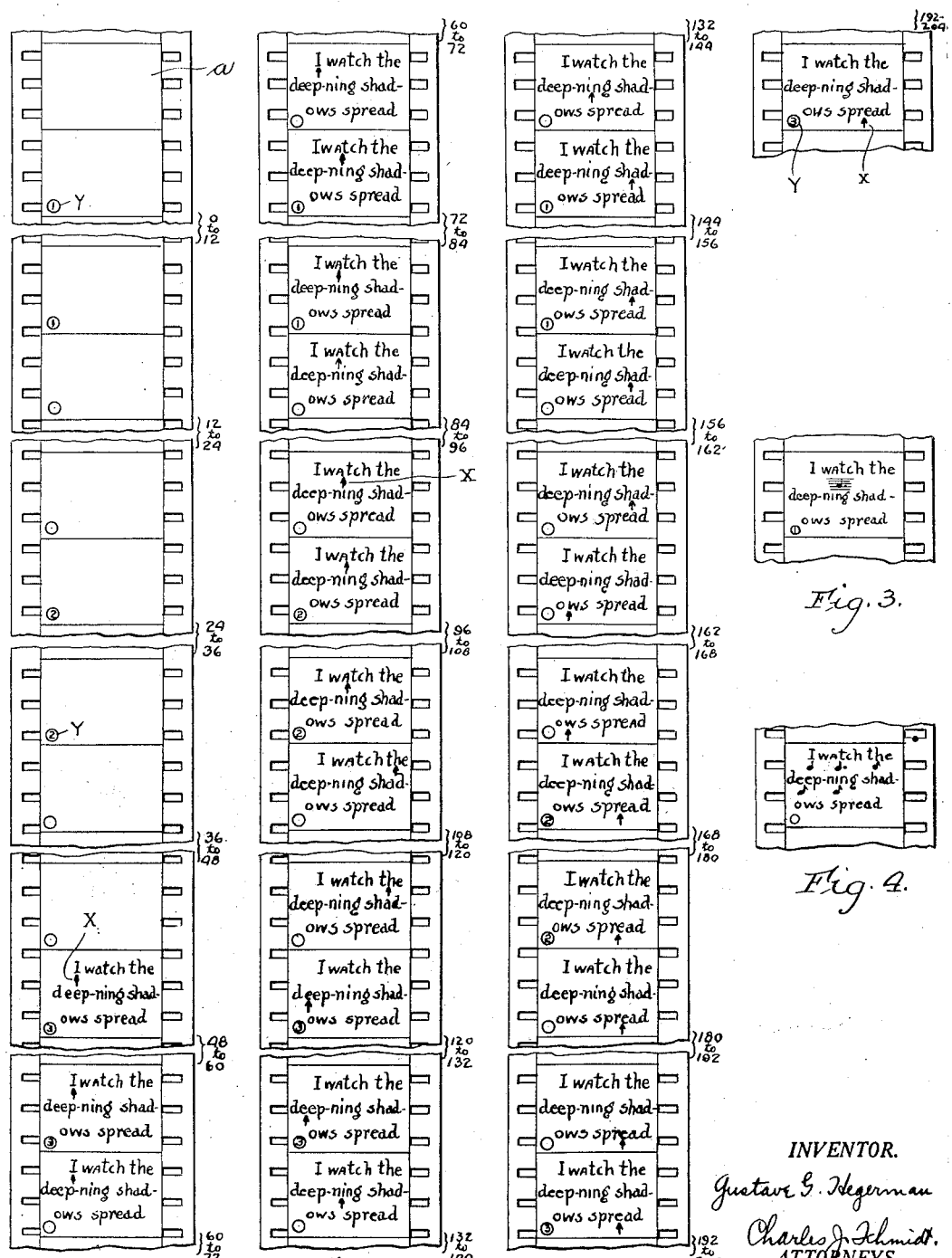
INVENTOR.  
Gustave G. Hegerman  
Charles J. Schmidt  
ATTORNEYS.

Patented Nov. 18, 1924.

1,516,278

UNITED STATES PATENT OFFICE.

GUSTAVE G. HEGERMAN, OF CHICAGO, ILLINOIS.

CINEMATOGRAPH FILM.

Application filed August 6, 1923. Serial No. 655,836.

*To all whom it may concern:*

Be it known that I, GUSTAVE G. HEGERMAN, a citizen of the United States, and a resident of Chicago, in the county of Cook and State of Illinois, have invented certain new and useful Improvements in Cinematograph Films, of which the following is a specification.

My invention relates to an improved cinematograph film for facilitating the rythmic and proper reading of literary text by a class or audience, or for facilitating the singing of a song by an audience with or without music accompaniment. The invention herein may be considered as a modification under the broad invention disclosed in my copending application Serial No. 605,348 filed December 7, 1922. The broad invention as expressed in this copending application is to have the text to be read or sung projected through the film on the screen in its entirety while reading or singing is going on and to guide the audience in reading or singing the words to the proper time or rythm by associating indicating means with the words in sequence and at the particular time when the words are to be read or sung. In the particular arrangement disclosed in the copending application referred to this is accomplished by a system of differential light quality, intensity or illumination in which the consecutive words are changed in appearance at the proper time so that the pronouncing or singing thereof will be in the proper predetermined rythm and time. In the specific arrangement shown in the copending application the text appears on the screen under illumination just sufficient to permit a mental note or reading thereof and the individual words then are consecutively brought to increased and contrasting illumination at the proper time so that the audible reading or singing will be in synchronism with the proper predetermined time or rythm.

In the modified arrangement as disclosed in this present application the entire text to be read or sung will appear on the screen at full illumination and indicating means which may be projected through the same film and then applied to the individual words or syllables in sequence, the indicating means for each word or syllable appearing on the screen at the particular time when such word or syllable is to be read or sung. In the case of a song the indicating means could be in the form of notes, the note to which each word or syllable is to be sung appearing at the proper time adjacent such word or syllable, the nature of the note then assisting the singer in properly singing the associated word or syllable.

On the accompanying drawing which illustrates my improved process and film,

Fig. 1 is a line of song and the music to which it is to be sung,

Fig. 2 shows the arrangement on the film for a part of the song, and

Figs. 3 and 4 show modified arrangements.

Cinematograph films are divided into successive exposure areas or frames, and the projecting machines are usually motor-driven to cause the film to travel accurately at a uniform rate of speed. In preparing a film for carrying out my invention the first step will be to determine the number of frames to be devoted to each syllable, word or character of the text in accordance with the rythm or music to which the text is to be read or sung. This can be determined mathematically as fully disclosed in my other copending application Serial No. 564,195 filed May 27, 1922, or by means of the procedure disclosed in my copending application Serial No. 605,348 filed December 7, 1922, already referred to hereinbefore. In Fig. 2 I show a length of film for the song shown in Fig. 1. For want of space I show on each frame of the film only the first line of the song "I watch the deep-ning shad-ows spread", it being understood of course that the entire song or one entire verse thereof will usually appear on each frame. On the same film are also provided indicating means such as the arrows X. These arrows are positioned below and pointing toward the words or syllables of the text and are so distributed on the film that when the film is run through the projecting machine and the text appears on the screen, the indicating arrow for each word or syllable will appear on the screen to indicate to the audience the proper time for reading or singing such word or syllables. In other words, when the film is projected, it will appear as though the arrow were traveling below the text line from one word to the next, and when the audience reads or sings the word or syllable when the arrow appears thereunder the result will be the reading or singing of the text to the predetermined desired rythm. In the case of a song with music accompaniment means may be provided for enabling the organist or musical director to keep the music in synchronism with the time and rythm prescribed by the film. Such means may be in the form of the beat indications Y arranged and operating as fully disclosed in my copending applications referred to.

Decribing more specifically the arrangement in Fig. 2, twenty-four film frames are allotted to each quarter note and a corresponding number of frames to full notes, sixteenth notes, eighth notes, etc. At the beginning of the film a number of frames A is devoted to descriptive or introductional matter for the song. There being twenty-four frames to the quarter note, the first measure of the song, which is written to three-quarter time, will require seventy-two frames, the song starting at the third beat of the measure so that after forty-eight blank frames the text will appear on the frames and be projected on the screen. Simultaneously with the arrival of the text an arrow X will appear under the first word "I" and will remain there for twenty-four frames, the note to which the word is to be sung being a quarter note. The arrow will then disappear from under the word "I" and an arrow will appear under the next word "watch" and remain there for thirty-six frames, as the musical character above the word comprises a one-quarter note and a one-eighth prolongation. The arrow will then disappear from under the word "watch" and an arrow will appear under the next word "the", and as the note above this word is a one-eighth note the arrow will remain for a stretch of twelve frames and will then disappear to appear consecutively under the syllables "deep" and "ning" for a period of twelve frames each as the notes above said syllables are eighth notes. In the third measure the first note over the syllable "shad" is an eighth note followed by a one-sixteenth prolongation dot, the combination requiring eighteen frames, and with the first beat of the third measure the arrow will appear under this syllable and will remain there for a stretch of eighteen frames to then disappear and to reappear under the syllable "ows" for a period of six frames as the associated note is a one-sixteenth note. This travel of the arrow in association consecutively with the words continues to the end of the song, the appearance of the arrow under a syllable or word being the signal for singing such syllable or word and the singing thereof continues while the arrow shows. The audience is thus guided by the arrows while the accompanist is guided by the beat indications Y and the music and singing will at all times be in mutual synchronism and in synchronism with the time and rythm of the song. Where the text is poetry or other literary composition the arrows will be of great assistance to the pupils or an audience in reading the text to the proper inflection, expression and rythm and my invention is therefore of great utility in the educational field for instruction in speaking, reading, declamation and oratory as well as in singing.

Instead of arrows other indicating characters could be employed. The notes themselves could be used as indicating characters and serve the additional purpose of giving the audience the tune to which the words are to be sung. In Fig. 3 I show under the word "watch" the musical character to which it is to be sung and the audience who understand music will observe the quarter note followed by the one-eighth prolongation dot and will govern their singing accordingly. Instead of having the indicating note or arrow disappear after the time for singing the associated word has ended the characters could remain. This is illustrated in Fig. 4 each word having its associated indicating character still appearing thereunder at the conclusion of the projection of the text on the film. With experienced singers the arrangement of Fig. 3 would enable a song to be readily and properly sung without music accompaniment. With music accompaniment the arrow would be the simplest indicating means as the singers would then get the music by ear and would have to watch only the arrow to get the words in proper sequence and time.

I do not desire to be limited to the exact arrangement and procedure shown and described as modifications are possible which still come within the scope of the invention.

I claim as follows:

A cinematograph film for a text to be read having the text on each of its frames and having also indicating means progressively associated with the words or syllables of the text to appear at each word or syllable at such time as such word or syllable is to be read when the film is projected on the screen.

In witness whereof, I hereunto subscribe my name this 27th day of July, A. D. 1923.

GUSTAVE G. HEGERMAN.